United States Patent [19]
Wesolowski

[11] Patent Number: 5,806,239
[45] Date of Patent: Sep. 15, 1998

[54] ELEVATED PLANT WATERING HANGER

[76] Inventor: David D. Wesolowski, P.O. Box 1000, Atascadero, Calif. 93423

[21] Appl. No.: 688,809

[22] Filed: Jul. 31, 1996

[51] Int. Cl.[6] .................................................... A01G 31/00
[52] U.S. Cl. .................................................... 47/39; 47/62
[58] Field of Search ................................ 47/39, 48.5, 62, 47/67, 79, 80, 81, 82; 348/163.1, 163.2, 434, 435, 167, 175

[56] References Cited

U.S. PATENT DOCUMENTS

| | | | |
|---|---|---|---|
| 1,063,395 | 6/1913 | Scribner | 47/37 |
| 1,538,081 | 5/1925 | Bank | 47/67 |
| 3,015,024 | 12/1961 | Charchan et al. | 47/39 X |
| 3,357,129 | 12/1967 | Torrence | 239/38 |
| 4,270,696 | 6/1981 | Pointer, Jr. | 239/38 |
| 4,562,959 | 1/1986 | Pointer, Jr. | 239/38 |
| 4,760,666 | 8/1988 | Han | 47/79 |
| 4,825,591 | 5/1989 | Han | 47/67 |
| 4,848,029 | 7/1989 | Han | 47/79 |
| 4,951,416 | 8/1990 | Gutridge | 47/39 X |
| 5,037,049 | 8/1991 | Funk | 47/39 X |
| 5,502,922 | 4/1996 | Shlomo | 47/39 X |
| 5,598,662 | 2/1997 | Droste | 47/39 |

*Primary Examiner*—Michael J. Carone
*Assistant Examiner*—Robert Pezzuto
*Attorney, Agent, or Firm*—Leo F. Costello

[57] ABSTRACT

An apparatus for watering a plant while it is supported in an elevated position is provided which includes an elongated tubular standard which has a longitudinal axial passageway and upper and lower end portions and which is mounted in an upstanding position. A flexible hose is threaded through the passageway of the standard and has upper and lower end portions respectively projecting from the upper and lower end portions of the standard. A hanger is provided on the upper end portion of the standard for supporting a plant, and a nozzle is attached to the upper end portion of the hose in a position to dispense water to the plant either by a drip irrigation method or by a spay or other method. The lower end portion of the hose is connected to a source of water under pressure for supplying water to the nozzle. The apparatus provides an attractive support for a plant while enabling it to be regularly watered. It can be manufactured from a plurality of parts which in disassembled condition are convenient for distribution and sale and final assembly by a user. Also, the apparatus supports the plant in such a manner that water dripping from its container does not contact the apparatus and cause corrosion and wear.

19 Claims, 4 Drawing Sheets

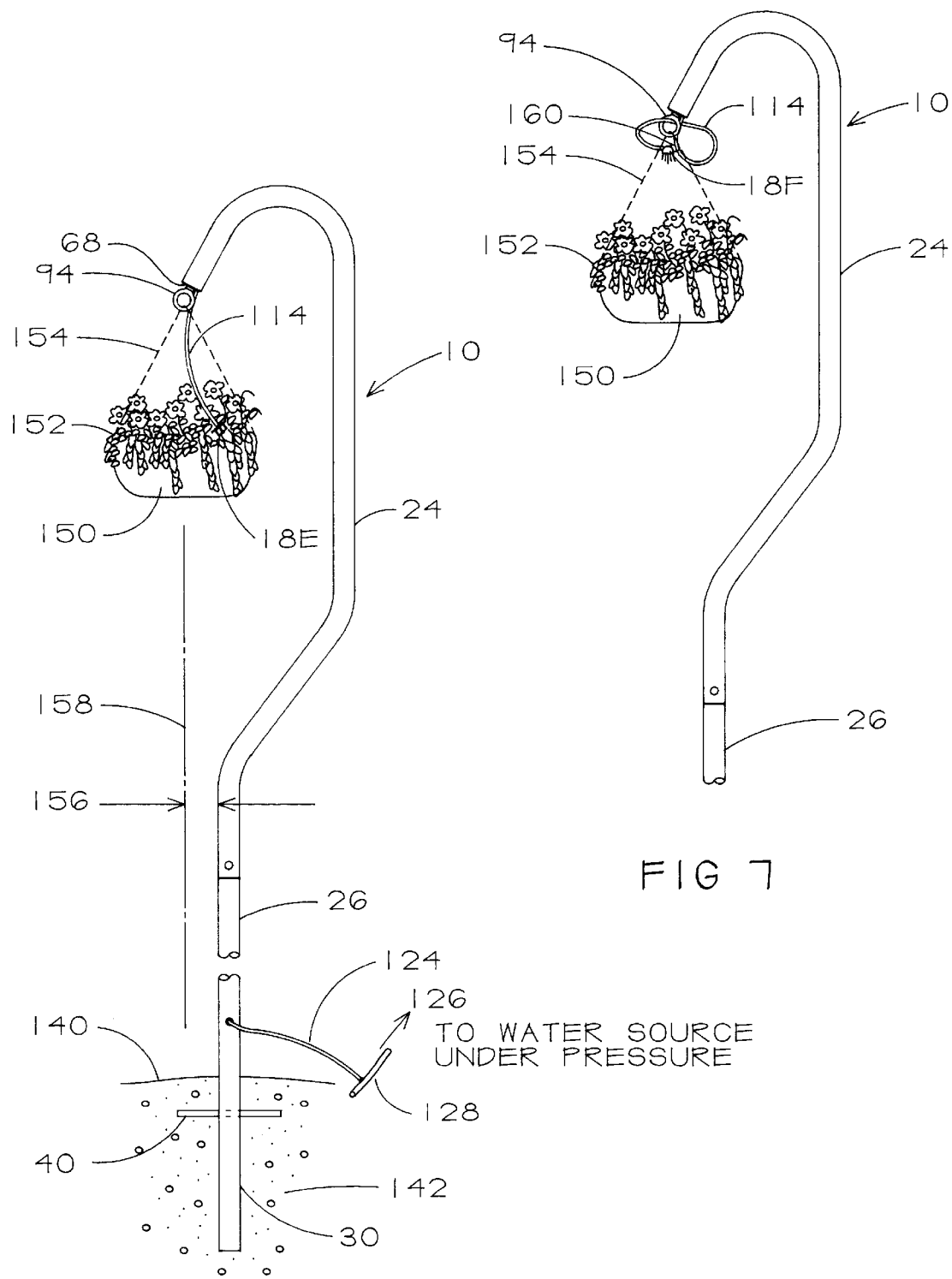

ELEVATED PLANT WATERING HANGER

FIELD OF THE INVENTION

The present invention pertains to an elevated plant watering apparatus and more particularly to an apparatus for supporting plants in an elevated position while enabling them to be watered regularly.

BACKGROUND

One of the ways to add interest to a landscaping plan is to utilize hanging baskets of flowers or other plants. Typically, when a hanging plant is used in this manner, it is suspended from a roof overhang by wires or macrame. Although a suspended, live, colorful plant can be an attractive addition to a landscaping plan, conversely, a wilted or dead plant suspended where it is especially visible can be a significant detraction from the plan. Thus, the major problem with using suspended plants in a landscaping plan is the difficulty of watering them regularly, especially in relatively dry climates.

The foregoing problem associated with suspended plants has been recognized in such U.S. patents as the patents to Scribner No. 1,063,395, Bank No. 1,538,081, Pointer, Jr. No. 4,270,696, and Hahn No. 4,760,666. Each of these patented watering devices, and others similar to them, all involve positioning a reservoir or head of water above the plant and providing for release of the water according to the mechanisms involved. The Bank patent also discloses a hose connected to the reservoir and draped down from the elevated reservoir and plant for connection to a water faucet at ground level.

There are several disadvantages with the patented devices for watering hanging baskets of flowers. It is immediately apparent that, whereas the hanging flower baskets are intended to add natural color and beauty to the landscape, these watering mechanisms introduce another object of attention which, however designed, may detract from the intended purpose. Moreover, these known devices are either relatively complex, costly, unsightly, wasteful of water and/ or are incompatible with modern water-conserving irrigation systems. In addition, most require adjustment or undesirable maintenance and in one case, Scribner, a specially molded flower pot.

Regarding water conservation, the use of drip irrigation systems has become almost mandatory in drier climates. None of the known devices is adapted for connection to an existing drip irrigation system whereby suspended plants are watered with drip irrigation on a schedule consistent with an overall irrigation system.

SUMMARY

An apparatus for watering a plant while it is supported in an elevated position is provided which delivers water to the immediate area of the plant through the suspension structure. The disclosed embodiment includes an elongated tubular standard of an attractive design which has a longitudinal axial passageway and upper and lower end portions and which is mounted in an upstanding position. A flexible hose is threaded through the passageway of the standard and has upper and lower end portions respectively projecting from the upper and lower end portions of the standard. A hanger is provided on the upper end portion of the standard for supporting a plant, and a nozzle is attached to the upper end portion of the hose in a position to dispense water to the plant either by drip irrigation, spray, or otherwise. The lower end portion of the hose is connected to a source of water under pressure for supplying water to the nozzle. Important features of the apparatus include its manufacture from a plurality of parts which in disassembled condition are convenient for distribution to and final assembly by a user. Also, the container is supported in such a manner by the apparatus that water dripping from a container does not contact the apparatus and cause corrosion and wear.

An object of this invention is to facilitate the watering of a suspended plant.

Another object is to apply water efficiently to a suspended plant in order to maintain the plant in a live, healthy condition while conserving water and avoiding waste.

An additional object is to enable elevated plants to be automatically watered on a regular schedule.

Yet another object is to deliver water to suspended plants by a variety of methods including drip irrigation, fogging, and other methods.

A still further object is to provide an elevated plant watering apparatus which can easily be incorporated in an established drip irrigation system.

Still another object is to provide an elevated plant watering apparatus which is manufactured in a plurality of parts which can be easily shipped as a kit of parts from a manufacturing center to various distribution points for purchase and ready assembly by the ultimate user.

A further object is to provide an elevated plant watering apparatus which suspends a plant under a source of water in such a position that water which is applied to the plant from the source, and which percolates through the plant into its planting medium and drips downwardly therefrom does not drip directly on the apparatus.

Yet another object is to provide an elevated plant watering apparatus with clean and simple lines and with an attractive design that enhances the appearance of the live plants being supported.

A still further object is to provide a watering apparatus for an elevated plant which can readily be disassembled for cleaning or maintenance.

These and other objects, features and advantages of the present invention will become apparent upon reference to the following description, accompanying drawings, and appended claims.

DESCRIPTION OF THE DRAWINGS

FIG. 6 is a side elevation of the subject watering apparatus, with its standard foreshortened, mounted in the ground, connected to a water source under pressure, and supporting a container holding a plant being watered by a drip irrigation emitter.

FIG. 7 is a fragmentary side elevation similar to FIG. 6 but showing a plant in a hanging container being watered by fogging nozzle.

DETAILED DESCRIPTION

Figure 1:
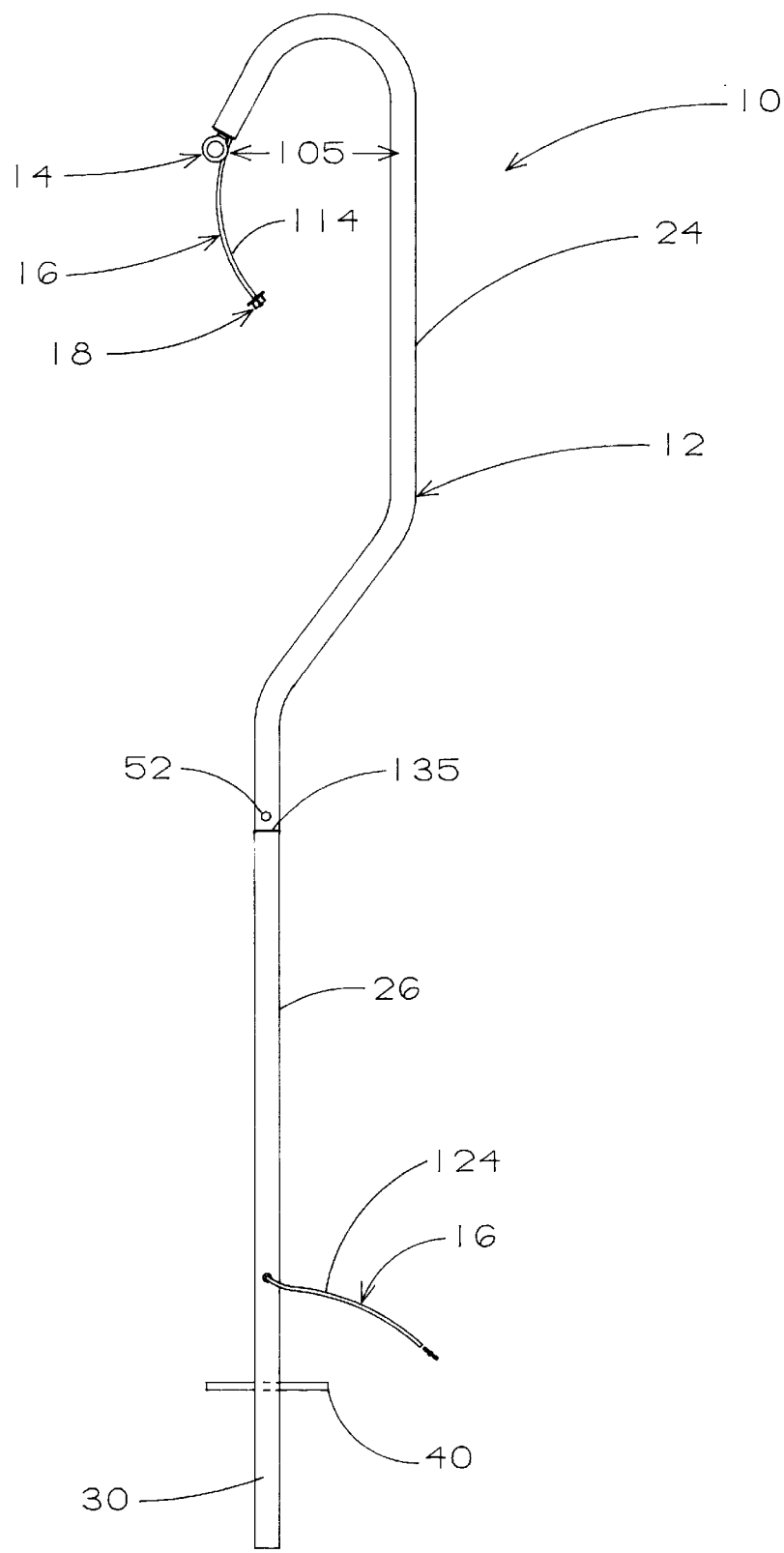
FIG. 1 is a side elevation of a fully assembled elevated plant watering apparatus of the present invention.

An elevated plant watering apparatus incorporating the principles of the present invention is generally identified by the numeral 10 in FIGS. 1, 6 and 7. The preferred embodiment shown and described is especially suited for use in a domestic or commercial outside landscaping plan. The watering apparatus includes a standard 12, a hanger 14, a hose 16, and a nozzle 18, each of which will be described in more detail. The standard is intended to be mounted in an upstanding position and so the following description is based on such an orientation. In this description, specific dimensions are provided for the preferred embodiment, it being understood that the principles of this invention are not limited to any particular dimensions. Specifying dimensions, however, does aid in describing significant relationships between certain parts, as will be pointed observed.

Figure 2:
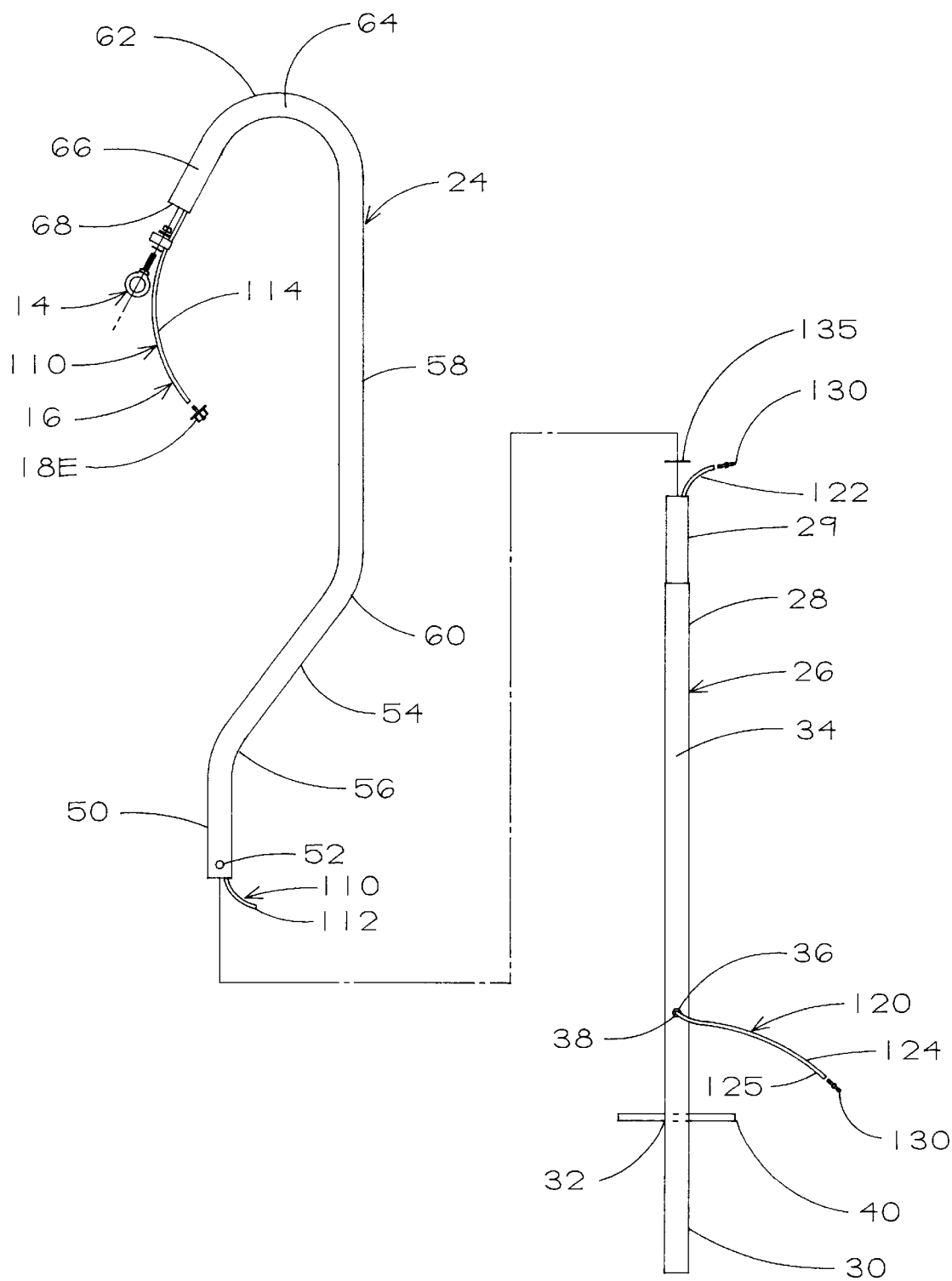
FIG. 2 is an exploded partially assembled side elevation of the apparatus shown in FIG. 1.

The standard 12 (FIGS. 1 and 2) is preferably made of hollow steel tubing having an outside diameter of one and five-eighths inch and a wall thickness of 0.060 inch. In manufacturing the standard, the steel tubing is initially a straight piece of about ten feet long but is bent into the shape to be described. The standard has a bent upper section 24 and a straight lower section 26, each having an overall length of approximately fifty-four inches for a total standard length of one hundred eight inches. The lower section 26 (FIG. 2) has an upper end portion 28 in which is welded a coupling sleeve 29 of reduced diameter which is preferably coated with aluminum. The lower section also has a lower mounting end portion 30 in which is drilled aligned holes 32 extending diametrically therethrough approximately thirteen inches from the bottom tip of the lower section. The lower section also provides an intermediate portion 34 (FIG. 2) in which is drilled a lower hose aperture 36 in one side at a position ninety degrees offset from the aligned holes 32. A rubber grommet 38 is fitted in the hose aperture, and a stabilizer bar 40 is extended through the holes 32 so that it projects outwardly from opposite sides of the mounting end portion.

The upper section 24 (FIG. 2) of the standard 12 has a straight, in-line lower end portion 50 in which is provided a set screw 52. This upper section also includes a straight, transverse intermediate portion 54 extending angularly upwardly and outwardly from the lower end portion 50 at an angle of approximately thirty-seven degrees from the vertical, thereby defining a lower obtuse angular junction 56 with the lower end portion. Also, the upper section includes a straight, intermediate offset portion 58 which is also at an approximately thirty-seven degree angle with the vertical thereby to define an upper obtuse angular junction 60 with the transverse portion 54 and to make the intermediate portion 58 and the in-line portion 50 parallel with each other. Still further, this upper section includes a crook-shaped upper end portion 62 including a curved apex 64 and a straight terminal portion 66 which provides a terminal opening 68. The terminal portion is reversely bent from the offset portion 58 at a approximate angle of one hundred fifty-seven degrees to form the curved apex which is in upwardly spaced opposed relation to the transverse intermediate portion. As such, the terminal end portion is nearly parallel to the transverse intermediate portion although off by about fourteen degrees in the disclosed embodiment.

It is stated above that the overall length, that is the height, of the standard 12 (FIG. 1) is approximately one hundred eight inches, this dimension being measured from the bottom top of the standard to a horizontal tangent to the apex 64. Moreover, the length of the in-line lower end portion 50 is approximately eight inches; the distance between the upper and lower junctions 60 and 56, respectively, is approximately twelve inches; and the distance between the upper junction and the horizontal tangent to the apex 64 is approximately thirty-four inches.

Figures 3, 4, 5:
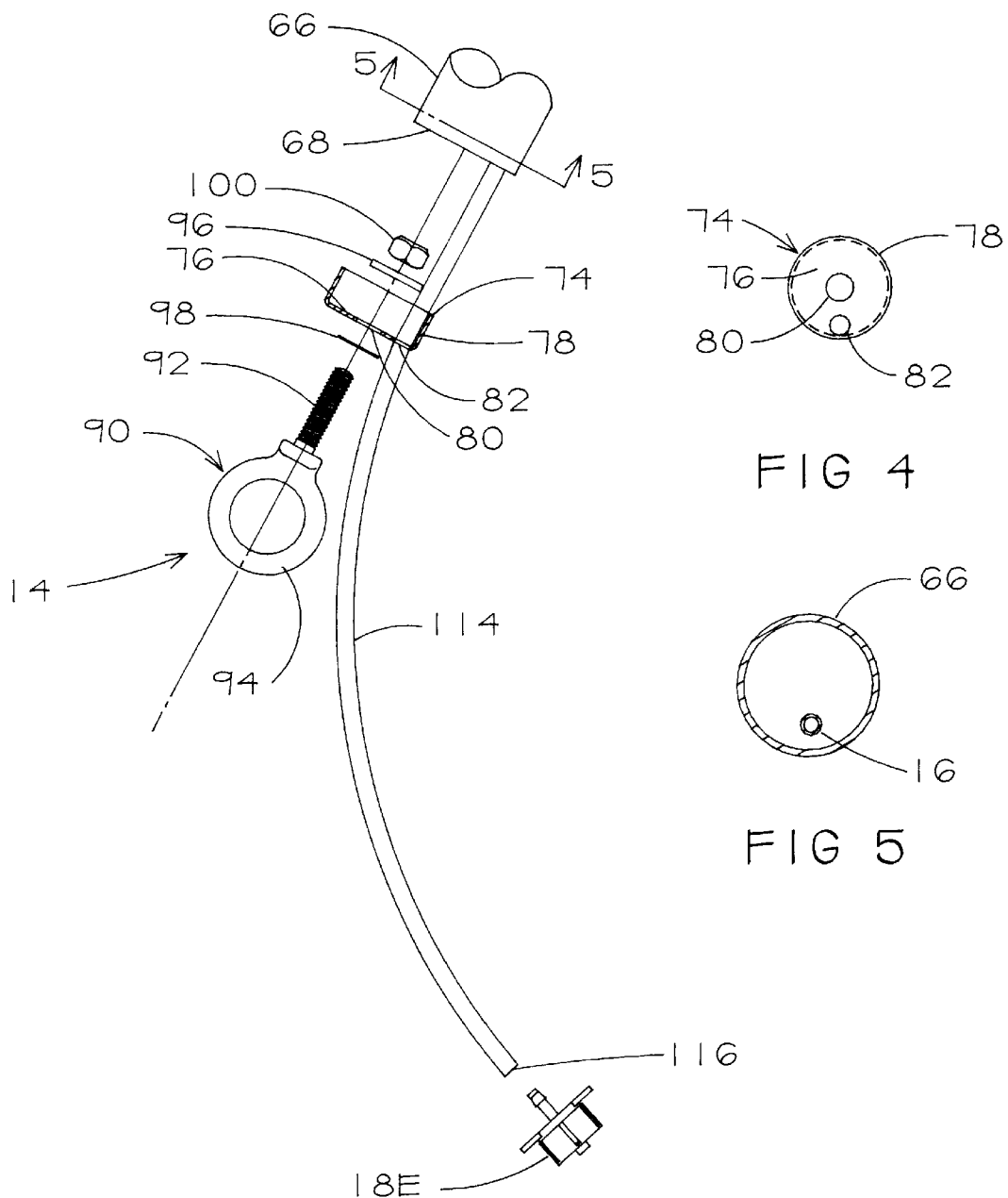
FIG. 3 is an enlarged exploded side elevation of parts of the watering apparatus shown in FIG. 2.
FIG. 4 is a detailed end view of the cap shown in FIG. 3.
FIG. 5 is a section taken on line 5—5.

With reference now to FIGS. 3 and 4 in particular, the hanger 14 includes a cup-shaped steel cap 74 having a radial end wall 76 and an annular wall 78. The outside diameter of the annular wall is slightly less than the inside diameter of the standard 12 so that the cap can be press-fit into the terminal opening 68 of the standard. The annular wall includes a central hole 80 and an upper hose aperture 82 offset from the central hole. A steel eye bolt 90 includes a threaded shank 92 and an eyelet or ring 94. The shank of the eye bolt is fitted through the central hole in the cap, a brass bushing 96 is placed around the shank inside the cap, a washer 98 is placed between the ring and the end wall, and a lock nut 100 is threaded on the shank.

The hanger 14 (FIG. 3) is assembled by attaching the eye bolt 90 to the cap 74 and tightening the bolt and the lock nut 100 so that the eye bolt and the cap are firmly secured against rotation relative to each other. The hanger is then assembled with the standard 12 by inserting the cap into the terminal opening 68 of the standard, and the cap is welded to the standard. The eye bolt is then backed-off about one turn, or as necessary, to allow the eye bolt to swivel in relation to the cap and thus the standard while the lock nut 100 maintains the connection. In this assembled condition, the distance 105 (FIG. 1) from the center of the eyelet to the longitudinal centerline of the offset intermediate portion 58 is approximately twelve and one-half inches.

The hose 16 (FIGS. 2, 3, and 5) is preferably a one-quarter inch flexible vinyl tubing which can be obtained from a variety of sources including Ag Products of Ontario, Calif. This hose includes multiple parts and thus has an upper section 110 which is threaded through the upper section 24 of the standard 12 by inserting one end of the hose into the upper hose aperture 82. The upper hose section is then pushed lengthwise through the longitudinal axial passageway of the upper section of the standard until its lower end 112 exits a short distance from the lower terminus of the upper section. The upper section of the hose is sufficiently long to leave an upper leader 114 extending from the upper section of the standard a distance of about twelve inches and having a terminal end 116.

The hose 16 (FIG. 2) also has a lower section 120 which is threaded through the longitudinal axial passageway of the lower section 26 of the standard 12 by inserting one end of this section into the grommet 38 in the lower hose aperture 36 of the standard and pushing the hose upward through the lower section of the standard until its upper end exits a short distance from the upper terminus of the lower section. Again, the length of the lower section of the hose is sufficient to provide a lower leader 124 extending outwardly from the lower hose aperture 36 a distance of about twelve inches and having a terminal lower end 125.

Upper and lower plastic barbed couplers 130 are force-fit into the upper and lower ends 122 and 125 of the lower section 120 of the hose 16. An O-ring 135 is placed around the upper exposed end 122 and the coupling sleeve 29 and slid down against the lower section 26 of the standard 12. The lower end 112 of the upper hose section 110 is then connected to the upper barbed coupler thereby joining the upper and lower sections of the hose. Thereafter, the upper section 24 of the standard 12 is fitted over the coupling sleeve 29 into engagement with the O-ring, and the set screw 52 is tightened thereby to connect the upper and lower sections of the standard. At this time, the upper and lower leaders 114 and 124 are gently tugged outwardly of their respective ends of the standard so as to straighten the hose within the standard and thereby to avoid any kinking.

The nozzle 18 included in the subject watering apparatus 10 may be a drip-type emitter 18E (FIGS. 1, 2, 3, and 6) or a fogger nozzle 18F (FIG. 7). In either case, the nozzle is attached to the terminal end 116 of the upper leader 114 of the hose 16. The emitter nozzle can be obtained from the James Hardie Irrigation Company in El Cajon, Calif., as part No. DPJ04-A, further identified as TURBO-SC™ Plus Emitter with Black Disc, having a nominal rating of four gallons per hour although experience indicates closer to two gallons per hour. The fogger nozzle can likewise be obtained from the James Hardie Irrigation Company as Barbed Fogger part SF J408, having a rating of 2PH. The Hardie company also sells the barbed couplers 130.

OPERATION

The plant watering apparatus 10 is manufactured in the parts described for distribution as a kit and final assembly by the user. The kit parts (FIG. 2) include the upper and lower standard sections 24 and 26, with the hanger 14 being connected to the upper section and the coupling section 29 connected to the lower section as sub-assemblies; the upper and lower hose sections 110 and 120; two barbed couplers 130; the stabilizer bar 40; nozzle 18E and 18F; the O-ring 135; and the grommet 38.

In use, the apparatus 10 is assembled as above described, and illustrated in FIG. 1, from the kit of parts and is then mounted in the ground 140 (FIG. 6). For this purpose, a hole is dug and the lower mounting-end portion 30 is placed in the hole so that the stabilizer bar 40 is slightly below the surface of the ground. With the lower section 26 of the standard perfectly plumbed in a vertical position, the hole is filled with concrete 141 which when hardened mounts the standard securely in an upstanding position. The lower leader 124 is then connected to a source of water under pressure, preferably via an automatic, timed, drip irrigation system. To this end, the lower barbed coupling 130 is connected to the main line 128 of the irrigation system.

A container 150 (FIG. 6) holding a plant 152 is supported on the eyelet 94 by a chain hanger 154, or other convenient suspension device, thereby placing the center of the container directly under the eyelet and the terminal opening 68. The container may be solid with a lower central opening or a moss-type container. It will be remembered that the eyelet swivels thereby facilitating the suspension of the container. Because of the dimensional relationships of the apparatus 10, as above described, such suspension places the container and the plant opposite to the offset portion 58 between the eyelet 94 and the lower junction 56. The upper section 24 of the standard thus partially frames the plant in a very appealing manner. Moreover, the center of the container is on a vertical line 158 offset from the lower section 26 of the standard 12, preferably by approximately three inches, as indicated by the offset distance 156, shown in FIG. 6. Water dripping from the container naturally falls along this line 156 and thus does not drip onto the standard and cause corrosion and wear.

If the drip-type emitter nozzle 18E is used (FIG. 6), the upper leader 114 is placed within the plant 152, resting on the top surface of its growing medium and at a suitable location for water to drip into the growing medium, thereby to permeate throughout the growing medium around the root system of the plant. If the fogger-type nozzle 18F is employed (FIG. 7), the leader is extended through the ring and wrapped around to form a loose knot so that the fogger nozzle is positioned essentially centrally above the container whereby water is sprayed down on the plant from above. It may be necessary to utilize a tie 160 to maintain the leader and the fogger nozzle in the desired position.

It is understood that the subject elevated plant watering apparatus 10 facilitates the efficient delivery of water, and perhaps liquid-borne plant nutrients, preferably by drip irrigation to hanging plants, thereby maintaining the plants in a live, healthy condition while conserving water and avoiding waste. The apparatus is manufactured and distributed as a kit of parts that are easy to assemble and install and just as easy to disassemble for maintenance. The apparatus minimizes contact of dripping water from contacting the standard and precludes any water that does make contact, either from wind-blown dripping or from the rain, from entering the interior of the standard. The apparatus performs the stated functions while providing a pleasing design that enhances the beauty of its well-nurtured plant.

Although a preferred embodiment of the present invention has been shown and described, various modifications, substitutions and equivalents may be used therein without departing from the spirit and scope of the invention. Accordingly, it is to be understood that the present invention has been described by way of illustration and not limitation.

What is claimed is:

1. An apparatus for watering a plant while being supported in an elevated position, comprising:

an elongated tubular standard having a longitudinal axial passageway, upper and lower end portions, and adapted to be mounted in upstanding position;

a flexible hose axially threaded through the passageway of the standard having upper and lower end portions respectively exiting from the upper and lower end portions of the standard, the lower end portion of the hose constituting means for connecting to a source of water under pressure;

a nozzle attached to the upper end portion of the hose; and means for hanging the plant from the upper end portion of the standard and under the nozzle so that the nozzle can deliver water downwardly on to the plant upon water being supplied under pressure to the hose;

wherein the upper end portion of the standard terminates in an open end;

wherein the upper end portion of the hose is an elongated upper leader extending out of and draped below the open end of the standard and providing a terminal opening therein;

wherein the nozzle is connected to the terminal opening of the leader and is thereby hung below said open end; and wherein said hanging means is adapted to hand the plant directly under the open end so that the leader can be moved to position the nozzle in selected locations where water is most effectively released onto the plant.

2. The apparatus of claim 1, wherein the hanging means includes a cap covering the open upper end of the standard, said cap having a central hole and an aperture offset from the hole, said aperture receiving the upper end portion of the hose therethrough; and wherein said hanging means also includes a hook attached to the cap in the central hole thereof and thereby adjacent to the leader so that the nozzle hangs on the leader below the hook.

3. The apparatus of claim 1, wherein the nozzle is a drip-type emitter;

wherein the hanging means is adapted to suspend the plant and the growing medium for the plant a predetermined distance below the open end of the standard; and wherein the leader is as long as said predetermined distance so that the nozzle can rest on said growing medium.

4. The apparatus of claim 1, wherein the nozzle is a fogger-type nozzle;

wherein the hanging means is adapted to suspend the plant and the growing medium for the plant a predetermined distance below the open end of the standard;

wherein the leader is flexed into a position with the nozzle disposed in spaced relation above the plant; and wherein means are included for holding the leader in said flexed position.

5. The apparatus of claim 1, wherein the upper and lower end portions of the standard are releasably interconnected at a juncture;

wherein the upper and lower end portions of the hose are releasably interconnected at the juncture of the upper and lower end portions of the standard;

wherein the lower end portion of the standard has a lateral opening therein; and wherein the lower end portion of the hose has a lower leader exiting from the standard through the lateral opening, said connecting means being adapted to connect the leader to the source of water under pressure.

6. An apparatus for watering a plant while being supported in an elevated position, comprising:

an elongated tubular standard having a lower mounting end portion, an intermediate portion laterally offset from the mounting end portion, and an upper end portion reversely downwardly curved from the intermediate portion and terminating in an open end laterally offset from the mounting end portion on the opposite side of the mounting end portion from the intermediate portion, said open end being also upwardly offset from the mounting end portion;

a nozzle;

means for connecting the nozzle to the standard and for conducting water through the standard to the nozzle;

means for connecting a supply of water under pressure to the conducting means; and means for hanging the plant on the standard at the open end thereof and laterally adjacent to the intermediate portion so that the nozzle is disposed in a position to deliver water to the plant and so that when the standard is in upstanding position, water dripping from the plant falls along a line offset from the mounting end portion of the standard.

7. The apparatus of claim 6, wherein said hanging means includes a hook connected to the open end of the standard so that the hook is laterally offset from the mounting end portion on the opposite side of the mounting end portion from the intermediate portion.

8. The apparatus of claim 6, wherein said eyelet is swivelable relative to the open end of the standard.

9. An apparatus for watering a plant while being supported in an elevated position, comprising:

an elongated tubular standard having a lower mounting end, an intermediate portion, and an arcuate upper end portion reversely bent from the intermediate portion and terminating in an open upper end that is in laterally spaced relation to the intermediate portion;

means at the lower mounting end for mounting the standard in an upstanding position so that the upper end portion extends downwardly;

an elongated flexible hose releasably threaded through the standard having a lower end section projecting out of the standard adjacent to the lower end thereof and an upper end section exiting from the open upper end of the standard and hanging downwardly therefrom, said upper end section of the hose having a terminal end opening, the standard being separable into first and second standard parts;

the hose being separable into first and second hose parts, the place of separation of said parts of the standard and the hose being at the same place lengthwise of the standard and the hose;

means for releasably joining the first and second parts of the standard;

means for releasably joining the first and second parts of the hose;

means for hanging the plant from the upper end portion of the standard so that the upper end section of the hose is disposed over the plant;

means for connecting the lower end section of the hose to a supply of water under pressure; and a nozzle connected to the upper end section of the hose.

10. The apparatus of claim 9, wherein a stabilizer bar extends transversely of the standard adjacent to the lower mounting end thereof.

11. The apparatus of claim 9:

wherein the nozzle is a drip-type emitter.

12. The apparatus of claim 9:

wherein the nozzle is a fogger nozzle.

13. The apparatus of claim 9, wherein the means for joining the separable parts of the hose are barbed fluid couplers.

14. The apparatus of claim 9, wherein the intermediate portion of the standard is laterally offset from the mounting end.

15. The apparatus of claim 14, wherein the lower mounting end is straight;

wherein the intermediate portion includes a straight lower section connected to the mounting end in alignment therewith, a straight transverse section angularly extending from the lower section, and a straight upper section extending upwardly from the transverse section substantially parallel to the lower section; and wherein the arcuate upper end portion curves away from the straight upper section in upwardly spaced opposed relation to the lower straight section.

16. The apparatus of claim 9, wherein the open upper end is horizontally offset from the lower mounting end and the intermediate portion, and wherein the hanging means is adapted to hang the plant on the open upper end whereby water delivered to the plant from the nozzle drips downwardly from the plant along a drip line that is horizontally offset from the lower mounting end and the intermediate portion.

17. The apparatus of claim 15, wherein the open upper end is horizontally offset from the lower mounting end and the intermediate portion, and wherein the hanging means is adapted to hang the plant on the open upper end whereby water delivered to the plant from the nozzle drips downwardly from the plant along a drip line that is horizontally offset from the lower mounting end and the straight lower section of the intermediate portion.

18. An elevated plant watering apparatus, comprising:

a tubular standard;

means for mounting the standard in upstanding position, said standard having an upwardly extending lower end portion and a crook-shaped upper end portion that extends outwardly in a first direction and upwardly from the lower end portion and then extends inwardly in a second direction opposite from said first direction and downwardly toward the lower end portion to an open upper end that is spaced upwardly from the lower end portion, said open upper end being laterally offset from the remainder of the crook-shaped portion and from the lower end portion so that said open upper end lies on a vertical line that is horizontally spaced from the lower end portion;

a flexible hose threaded through the standard having an upper leader hanging downwardly from the open upper end of the standard;

means for hanging a plant on the open upper end so that the leader is disposed over the plant; and means for dispensing water from the leader onto a plant hung on the open upper end of the standard.

19. The apparatus of claim 18, wherein the standard and the hose are releasably separable into multiple parts.

* * * * *

UNITED STATES PATENT AND TRADEMARK OFFICE
CERTIFICATE OF CORRECTION

PATENT NO. : 5,806,239
DATED : 9/15/98
INVENTOR(S) : Wesolowski

It is certified that error appears in the above-identified patent and that said Letters Patent is hereby corrected as shown below:

Column 6, line 47, "hand" should read --hang--.

Signed and Sealed this

Twenty-third Day of February, 1999

Attest:

Q. TODD DICKINSON

*Attesting Officer*           *Acting Commissioner of Patents and Trademarks*